(12) United States Patent
Garbagnati et al.

(10) Patent No.: US 10,994,939 B2
(45) Date of Patent: May 4, 2021

(54) RUBBERIZED PAD, IN PARTICULAR FOR CHAINS FOR HANDLING/LIFTING PRODUCTS IN PRODUCT LINES

(71) Applicant: REGINA CATENE CALIBRATE S.P.A., Milan (IT)

(72) Inventors: Carlo Garbagnati, Castello di Brianza (IT); Norberto Cattaneo, Usmate Velate (IT)

(73) Assignee: REGINA CATENE CALIBRATE S.P.A., Milan (IT)

( * ) Notice: Subject to any disclaimer, the term of this patent is extended or adjusted under 35 U.S.C. 154(b) by 0 days.

(21) Appl. No.: 16/901,748

(22) Filed: Jun. 15, 2020

(65) Prior Publication Data
US 2020/0391950 A1     Dec. 17, 2020

(30) Foreign Application Priority Data

Jun. 13, 2019 (IT) .......................... 102019000008835

(51) Int. Cl.
*B65G 17/26* (2006.01)

(52) U.S. Cl.
CPC .... *B65G 17/26* (2013.01); *B65G 2812/02346* (2013.01)

(58) Field of Classification Search
CPC ........ B65G 17/26; B65G 17/28; B65G 17/44; B65G 37/005; B65G 2201/0244
USPC .......................................... 198/690.2, 699.1
See application file for complete search history.

(56) References Cited

U.S. PATENT DOCUMENTS

| | | | | | |
|---|---|---|---|---|---|
| 2,297,296 | A | * | 9/1942 | Flintjer | A01D 23/04 198/626.1 |
| 3,770,098 | A | * | 11/1973 | Baugnies | B29C 49/421 198/377.03 |
| 3,869,038 | A | * | 3/1975 | Piper | B65G 69/165 198/626.1 |
| 4,064,987 | A | * | 12/1977 | Rowan | B65G 37/005 198/604 |

(Continued)

FOREIGN PATENT DOCUMENTS

| | | |
|---|---|---|
| DE | 4204884 A1 | 9/1993 |
| JP | S57147810 U | 9/1982 |

OTHER PUBLICATIONS

IT Search Report dated Jan. 28, 2020 re: Application No. IT 201900000835, pp. 1-7, citing: DE 42 04 84 A1, JP S57 147810 U and US 4 798 281 A.

*Primary Examiner* — Joseph A Dillon, Jr.
(74) *Attorney, Agent, or Firm* — Cantor Colburn LLP

(57) ABSTRACT

A rubberized pad with high flexibility, in particular for chains for handling/lifting product line products, has a vertical symmetry axis with a full base for coupling with the chain and a hollow upper part, including a wall opposed with respect to said base and suitable for engaging with a conveyed product. The pad has a total height and the upper part includes lateral walls having two semi-walls, with a thickness and connected with the wall, and two semi-walls having a thickness connected with the base. The pairs of semi-walls making between each other an angle (a1) directed toward the hollow part of the upper part, the semi-walls realizing an angle (a2) with respect to the vertical symmetry axis of the pad. The pad has a ratio between the height and thickness of ≥10, in that the angle (a1) is ≤90°, and in that the angle (a2) is ≥40°.

10 Claims, 4 Drawing Sheets

(56) References Cited

U.S. PATENT DOCUMENTS

| | | | | |
|---|---|---|---|---|
| 4,570,785 | A * | 2/1986 | Lewanski | B65G 37/005 198/626.6 |
| 4,798,281 | A | 1/1989 | Egger | |
| 5,090,557 | A * | 2/1992 | Carmen | B65G 15/14 198/626.1 |
| 5,211,279 | A * | 5/1993 | Abbestam | B23Q 1/262 198/750.1 |
| 5,219,065 | A * | 6/1993 | Hodlewsky | B65G 17/086 198/626.6 |
| 5,775,068 | A * | 7/1998 | Strasser | B65B 9/073 198/626.1 |
| 5,915,525 | A * | 6/1999 | Baker | B65G 15/14 198/575 |
| 6,120,871 | A * | 9/2000 | De Biase | B65G 69/001 114/219 |
| 6,772,876 | B2 * | 8/2004 | Spangenberg | B65G 17/066 198/867.02 |
| 7,032,737 | B2 * | 4/2006 | Egger | B65G 15/14 134/127 |
| 7,261,199 | B2 * | 8/2007 | Hartness | B67C 3/225 198/470.1 |
| 8,186,563 | B2 * | 5/2012 | Sugihara | B23K 1/0016 228/37 |
| 9,565,801 | B2 * | 2/2017 | Albarran | A01D 45/263 |
| 9,776,751 | B2 * | 10/2017 | Lukes | B65G 47/28 |
| 9,840,370 | B2 * | 12/2017 | Corlett | B65G 15/42 |
| 9,861,037 | B2 * | 1/2018 | Jens | A01D 61/02 |
| 2017/0233962 | A1 * | 8/2017 | Desiderioscioli | B65G 1/02 404/6 |

* cited by examiner

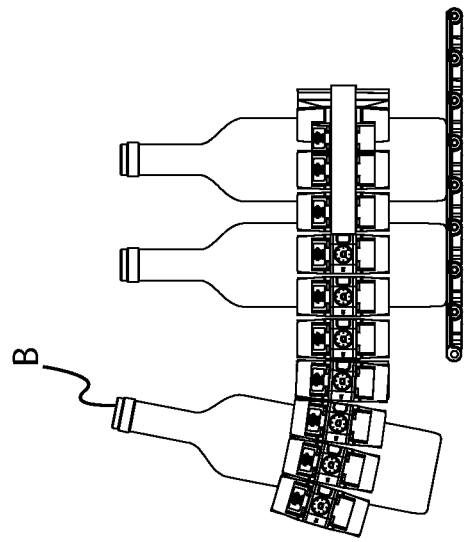
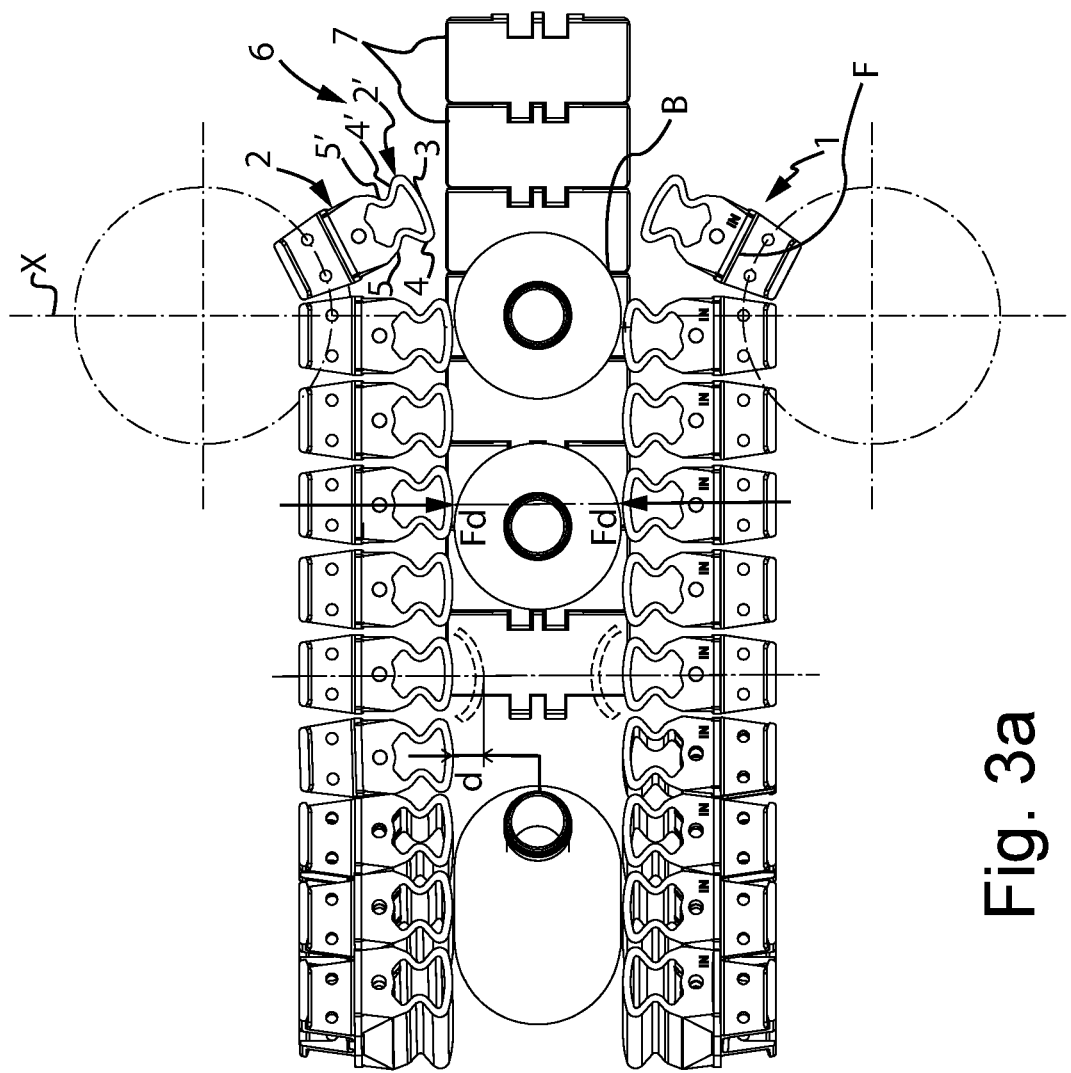
Fig. 3b
Fig. 3a

RUBBERIZED PAD, IN PARTICULAR FOR CHAINS FOR HANDLING/LIFTING PRODUCTS IN PRODUCT LINES

CROSS-REFERENCE TO RELATED APPLICATIONS

This application is related to an claims the benefit of Italian Patent Application No. 102019000008835, filed on Jun. 13, 2019, the contents of which are hereby incorporated by reference in their entirety.

TECHNICAL FIELD

The present disclosure refers to a rubberized pad with high flexibility, in particular for chains for handling/lifting products in product lines.

BACKGROUND

As is known in conveyor lines, in particular in the elevators and the descenders used in glassworks, chains with rubberized pads are used for handling and/or lifting the products.

The use of elevators/descenders within a line may be necessary for:
- avoiding obstacles in the layout of the conveying line;
- handling products between different production levels;
- making steps that would otherwise force operators to travel long distances;
- production need (for example in the case of pad reversers in glassworks which are used to evacuate any contaminants from the product or to allow washings of the entire container).

In order to allow such handlings, there are various types of chains which differ in the geometry of the rubberized pads which can have different shapes, as illustrated in FIGS. 1a, 1b, 1c and 1d. Such pads differ according to the external shaping, and can be mainly identified as finger pads (FIGS. 1a-1b-1c) and with closed geometry (or D-shape) (FIG. 1d).

In particular, the pads for use in chains are characterized mainly on the basis of their shape and the properties of the material that constitutes them.

Among the main factors that characterize the application aspect of said rubberized pads, the maximum deflection value (d), related substantially to the height of the pad, and the crushing force (Fd) consequent to said deflection, are identified; this latter characteristic depends on the geometry of the deformable elements, and on the material of the pad, in particular on its elasticity modulus and its hardness.

It is also known that these pads require grip capacity sufficient to lift and/or lower the elements to be conveyed on the conveyor lines; this aspect is related to the friction coefficient between the pad and the conveyed product.

In summary, the capacity to grip the product through the pad is therefore linked to the deflection force (Fd) achieved on the product to be conveyed and achieved by the deflection of the rubberized pads (d) in the direction x-x (FIG. 3a).

By analysing the application of a generic elevator/descender, it is possible to deduce the forces necessary for the retention of a product during its handling; they depend on:
- the weight of the product itself;
- the coefficient of friction (COF) between the surface of the product and the rubberized pad;
- the possible presence of contaminating elements (oils, greases, dust) between the pad and the product such as to reduce the COF;
- the presence of curvilinear paths and therefore of centrifugal forces, which add up to the weight of the product.

As regards the pads instead, as already anticipated, the forces they exert on the product to be conveyed depend substantially on:
- the geometry of the pad;
- the deflection of the pad;
- the mechanical characteristics of the elastomer with which the pad is made (elasticity modulus and hardness in particular).
- Coefficient of friction between the rubberized grip pad and the product to be handled.

As can be easily guessed, there is an optimal value of deflection force (Fd) which allows to obtain the right compromise in order to meet conveying needs.

It should not be neglected that the deflection force Fd that is exerted to guarantee the grip of the product is decisive for the calculation of the force that stresses the wear surface of the chain (reference F in FIG. 3a); therefore if the deflection force Fd is exceeded, there is the risk of having an early wear of both the chain and the guide elements since the limits of PV will be reached, whereby PV refers to the product "pressure×velocity", that is a tribological index indicative of the limits of use of elements in relative movement to each other.

It is therefore necessary that the force values (Fd) that allow the safe handling of the products are not too high and consequently do not cause the PV of the chain-pathway system to be exceeded.

It is also important to ensure that the deflection force Fd can remain constant for an extended deflection range (d). This characteristic of the pad will be referred to as "adjustment capacity".

The wide adjustment capacity is important since the freedom of adjusting the relative position of the pads according to the format of the conveyed product, weight, velocity, or other specific characteristics of the application is left to the operator.

Therefore, the reduced adjustment capacity could lead the operator to errors and consequent malfunctions caused by the excess of the deflection force.

Other important application factors that vary depending on the construction characteristics of the pads are:
- the limitation as much as possible of the "kicking" effect of the product, which occurs during the release of the product. In fact, the release of the rubberized pad tends to impart a variation in the product velocity in the direction of the motion; this component is usually unwanted as a result of the fact that it can cause an uneven spacing of the conveyed products and, in the worst of situations, the possible fall of the products;
- sanitization/cleanability (difficult for "finger" geometries since they represent receptacles of dirt that are difficult to clean).

The geometries of the pads of the known type allow to satisfy some of the mentioned requirements, even if they often present drawbacks, which limit their application fields.

Among the known pads, it can be mentioned, always referring to FIG. 1:
- the pads of FIG. 1a: they are suitable for the transport of heavy products, in which a significant adjustment capacity is not necessary and in which specific cleanability characteristics are not required; however they are characterized by a kicking effect of the product due to the effect of the asymmetry of the teeth and the high loads that distinguish them;

the pads of FIG. 1b: suitable for the transport of medium/ light products, in which a high adjustment capacity is necessary, and in which specific cleanability characteristics are not required; they are characterized by a kicking effect of the product due to the effect of the asymmetry of the teeth despite being characterized by medium/low deflection loads;

the pads of FIG. 1c: suitable for the transport of light products, in which a high adjustment capacity is necessary, and in which specific cleanability characteristics are not required; however they are characterized by a kicking effect of the product due to the effect of the asymmetry of the teeth, despite being characterized by low deflection loads;

the pads of FIG. 1d: suitable for the transport of medium/ heavy products, in which a significant adjustment capacity is not necessary and in which specific cleanability characteristics are required; they are characterized by a limited kicking effect due to effect of the symmetric geometry.

A pad geometry that allows combining all the application characteristics described so far does not exist.

SUMMARY

The aim of the present disclosure relates to provide a rubberized pad which solves the technical problems described above, obviates the drawbacks of the pads considered individually and overcomes the limits of the prior art allowing to have a unique geometry that allows the transport of both medium/heavy products and light products.

Within the scope of this aim, the present disclosure provides a pad which has a high adjustment range and a high cleanability.

Another object of the disclosure provides a pad which does not entail the kicking effect of the product when it is released.

A further object of the disclosure provides a rubberized pad that is capable of providing the broadest guarantees of reliability and safety in use.

Another object of the disclosure provides a pad for chains that is easy to realise and is economically competitive when compared with the prior art.

The aforementioned task, as well as the aforementioned purposes and others which will become better apparent as follows, are achieved by a rubberized pad as described in the appended claim 1, which allows combining the mechanical advantages of the finger pads (such as those indicated in FIG. 1b) with the advantages of cleanability of the pads with closed geometry (such as those shown in FIG. 1d).

Other features are described in the dependent claims.

DETAILED DESCRIPTION OF THE DRAWINGS

Further features and advantages shall be more apparent from the description of a preferred, but not exclusive, embodiment of a pad for chains, illustrated merely by way of non-limiting example with the aid of the accompanying drawings, in which:

Figures from 1a to 1d are front views of pads for chains according to the prior art;

FIG. 3a is a top view of a bottle conveying system including the pad for chains of FIG. 2;

FIG. 3b is a side view of the conveying system of FIG. 3a; and

Figure 2:
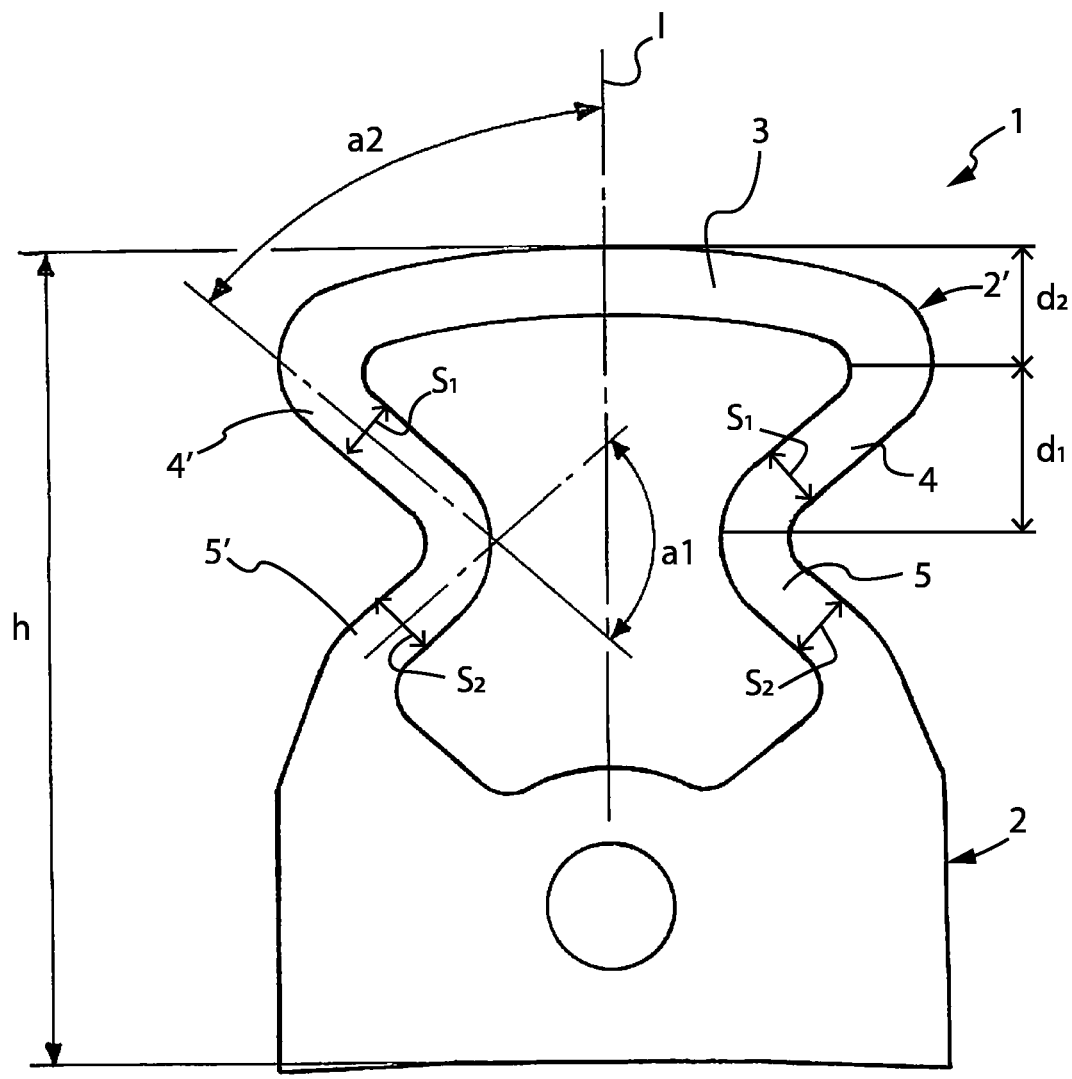
FIG. 2 is a front view of an embodiment of the pad for chains according to the disclosure.

With reference to FIG. 2, the rubberized pad for chains, in particular for chains for handling/lifting products in product lines, indicated globally with the reference number 1, includes a vertical symmetry axis I, a full base 2 for coupling with the chain and a hollow upper part 2', including a wall 3 opposed with respect to the base 2 and suitable for engaging with a conveyed product. The pad 1 has a total height h and the upper part 2' comprises two lateral walls comprised of two semi-walls 4,4', having a thickness s1 and connected to the wall 3, and two semi-walls 5,5' having a thickness s2 connected with the base 2. In particular, these pairs of semi-walls make between each other an angle a1 innerly directed toward the hollow part of said upper part 2', while the semi-walls 4,4' realize an angle a2 with respect to the vertical symmetry axis I of said pad 1.

According to the disclosure, the ratio between the height h and the thickness s1 is greater than or equal to 10, the angle a1 is less than or equal to 90°, and the angle a2 is greater than or equal to 40°.

Furthermore, the rubberized pad for chains 1 is made of an elastomer material with a hardness between 40 and 55 ShA.

In particular, the height h is comprised between 35 mm and 45 mm, preferably it is about 40.5 mm, the angle a1 is about 80° and the angle a2 is about 50°.

Furthermore, the thickness s1 of the half-walls 4,4' is less than 4 mm, preferably about 3.2 mm.

Additionally, the half-walls 5,5' have a thickness s2 of less than 4 mm, preferably 3.2 mm.

The distance d1, corresponding to the distance between the angle a1 between the half-walls 4; 4' and 5; 5' and the angle between the half-walls 4; 4' and the wall 3 is substantially greater than 6.9 mm, preferably about 9 mm.

Further the distance d2, corresponding to the distance between the angle between said half-walls 4; 4' and said wall 3 and the end of said upper part 2, is greater than or equal to 4.9 mm, preferably about 5.7 mm.

Finally, the top of said upper part 2 of the pad has an arcuate shape having a radius r of less than 100 mm, preferably about 50 mm.

FIGS. 3a and 3b illustrate the pad 1 according to the disclosure installed on a conveyor 6 of bottles B, having a plurality of links 7 and a plurality of said pads 1 which allow the handling of the bottles.

These described characteristics allow to obtain a pad having deflection characteristics, therefore of grip of the elements to be conveyed, which are optimal, such as those of the finger pads, including the advantages of the pads with closed geometry.

Figure 1D:
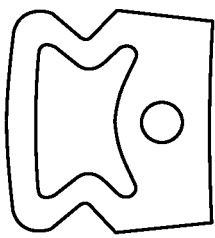
Figure 1C:
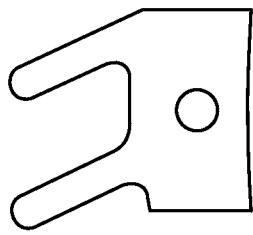
Figure 1B:
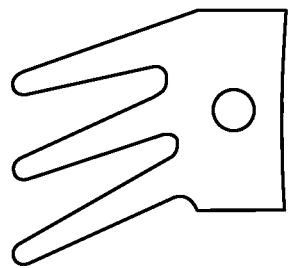
Figure 1A:
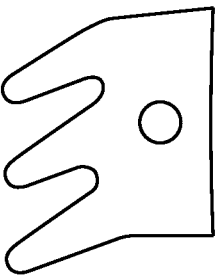
Figure 4:
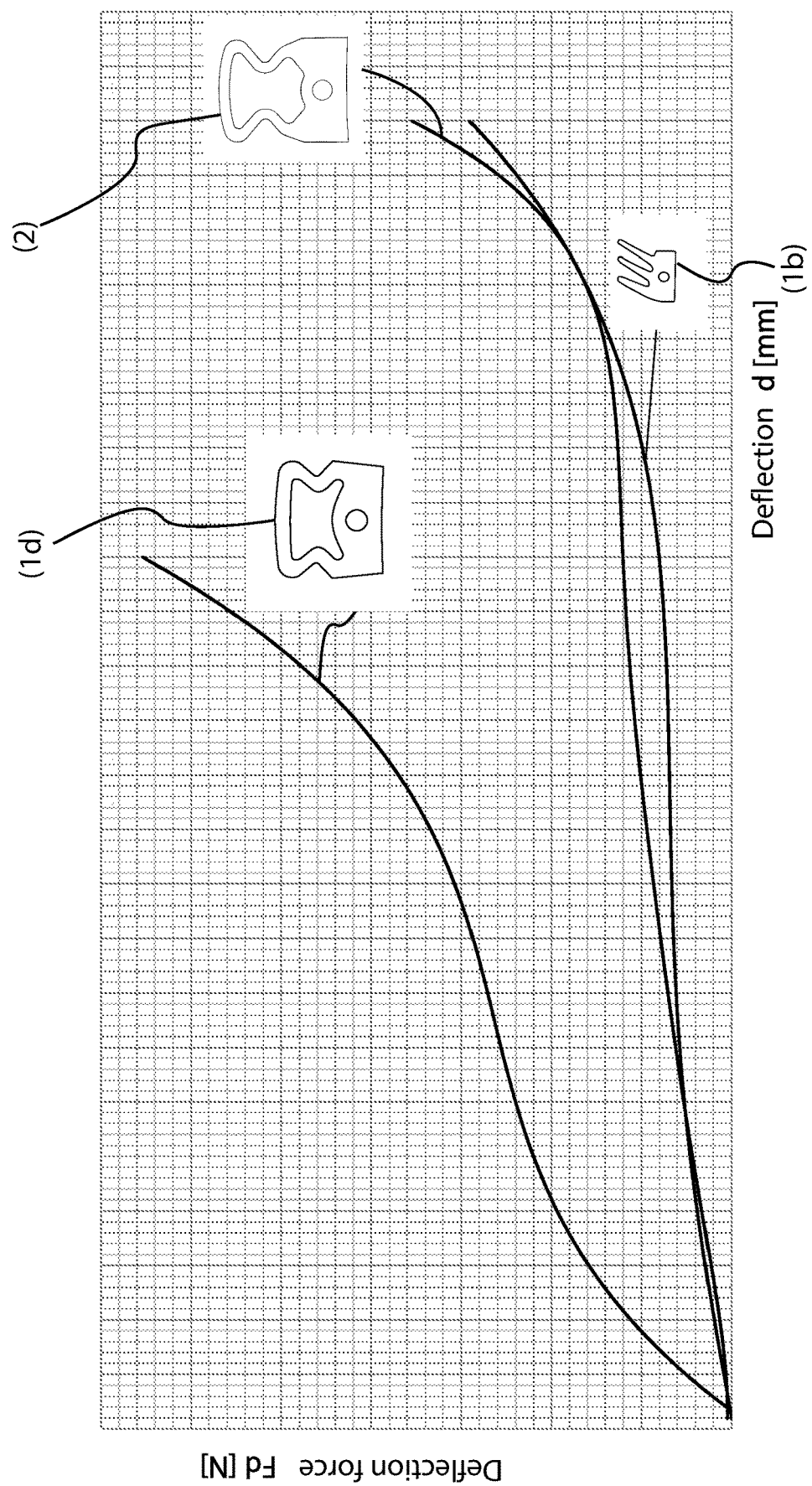
FIG. 4 is a graph representative of the deflection force (Fd) as a function of the deflection (d) of the pad according to the direction x-x indicated in FIG. 3a; this graph shows the trends for two known pads (type 1b and 1d) and for the pad according to the disclosure, shown in FIG. 2.

FIG. 4 illustrates a graph comparing the performances of a pad 1 according to the disclosure with respect to the two pads according to the prior art shown in FIGS. 1b and 1d, respectively. As can be seen, the deflection force Fd as a function of the deflection (d), obtained with the new closed geometry is substantially equivalent to that obtained with the finger geometry.

The operation of the rubberized pad is clear and evident from what has been described.

In practice, it has been found that the rubberized pad, according to the present disclosure, fulfils the intended aim and primary objectives (containment of the force Fd, extension of the adjustment range) while allowing the transport of objects under safe conditions.

Another advantage of the rubberized pad, according to the disclosure, relates to the fact of having a great cleanability which allows it to be used in the context of a high number of applications.

A further advantage of the rubberized pad, according to the disclosure, relates to the fact of having a limited kicking effect thanks to the symmetrical geometry thereof.

The rubberized pad for chains as it is conceived is susceptible to numerous modifications and variants, all falling within the scope of the inventive concept.

Furthermore, all the details can be replaced by other technically equivalent elements.

In practice, the materials used, as long as compatible with the specific use, as well as the dimensions and the contingent shape thereof, can be of any type according to the technical requirements. The present disclosure was described by way of non-limiting example, according to the preferred embodiments thereof, but it is understood that variations and/or modifications may be made by an expert in the field, without departing from the relative scope of protection, as defined in the appended claims.

The invention claimed is:

1. A rubberized pad for chains, the rubberized pad comprising: a vertical symmetry axis (I) with a base configured for coupling with the chain and a hollow upper part, including a wall opposed with respect to said base and configured for engaging with a conveyed product, said pad having a total height (h) and said upper part comprising lateral walls comprised of two semi-walls, having a thickness (s1) and connected with said wall, and two semi-walls having a thickness (s2) connected with said base, said pairs of semi-walls forming an angle (a1) innerly directed toward the hollow part of said upper part, said semi-walls realizing an angle (a2) with respect to said vertical symmetry axis of said pad, wherein said wall opposed with respect to said base has a wall thickness substantially equal to said thickness (s1) of lateral walls, said rubberized pad having a closed hollow geometry wherein the ratio between said height (h) and said thickness (s1) is ≥10, the angle (a1) is ≤90°, and the angle (a2) is ≥40°.

2. The rubberized pad for chains according to claim 1, wherein the rubberized pad is made of elastomeric material having a hardness between 40 and 55 ShA.

3. The rubberized pad for chains according to claim 1, wherein the rubberized pad has a height (h) comprised between 35 mm and 45 mm.

4. The rubberized pad for chains according to claim 1, wherein said angle (a1) is about 80°.

5. The rubberized pad for chains according to claim 1, wherein said angle (a2) is about 50°.

6. The rubberized pad for chains according to claim 1, wherein said thickness (s1) of said semi-walls is ≤4 mm.

7. The rubberized pad for chains according to claim 1, wherein the thickness (s2) of said semi-walls is ≤4 mm.

8. The rubberized pad for chains according to claim 1, wherein the rubberized pad has a distance (d1), corresponding to the distance between the angle (a1) between said semi-walls and and the angle between said semi-walls and said wall (3), ≥6.9 mm.

9. The rubberized pad for chains according to claim 1, wherein the rubberized pad has a distance (d2), corresponding to the distance between the angle between said semi-walls and said wall and the end of said upper part (2), ≥4.9 mm.

10. A rubberized pad for chains, the rubberized pad comprising: a vertical symmetry axis (I) with a base configured for coupling with the chain and a hollow upper part, including a wall opposed with respect to said base and configured for engaging with a conveyed product, said pad having a total height (h) and said upper part comprising lateral walls comprised of two semi-walls, having a thickness (s1) and connected with said wall, and two semi-walls having a thickness (s2) connected with said base, said pairs of semi-walls forming an angle (a1) innerly directed toward the hollow part of said upper part, said semi-walls realizing an angle (a2) with respect to said vertical symmetry axis of said pad, wherein the top of said upper part has a concave shape having a radius (r)<100 mm, said rubberized pad having a closed hollow geometry wherein the ratio between said height (h) and said thickness (s1) is ≥10, the angle (a1) is ≤90°, and the angle (a2) is ≥40°.

* * * * *